US010345857B2

(12) United States Patent
Yeom

(10) Patent No.: US 10,345,857 B2
(45) Date of Patent: Jul. 9, 2019

(54) INFORMATION PROCESSING METHOD AND ELECTRONIC DEVICE

(71) Applicant: Lenovo (Beijing) Co., Ltd., Beijing (CN)

(72) Inventor: Jihun Yeom, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 66 days.

(21) Appl. No.: 14/976,835

(22) Filed: Dec. 21, 2015

(65) Prior Publication Data

US 2017/0075389 A1 Mar. 16, 2017

(30) Foreign Application Priority Data

Sep. 16, 2015 (CN) .................. 2015 1 05900864

(51) Int. Cl.
*G06F 1/16* (2006.01)
*G09G 3/20* (2006.01)
*G06F 3/147* (2006.01)

(52) U.S. Cl.
CPC .......... *G06F 1/1652* (2013.01); *G06F 1/1626* (2013.01); *G06F 1/1662* (2013.01);
(Continued)

(58) Field of Classification Search
CPC .......... G06F 1/1652; G06F 3/02; G06F 3/005; G06F 3/0416; G06F 3/1446; G06F 2203/04102
(Continued)

(56) References Cited

U.S. PATENT DOCUMENTS 8,654,095 B1 2/2014 Cho et al.
9,412,341 B2 8/2016 Lin
(Continued)

FOREIGN PATENT DOCUMENTS

CN 103197879 A 7/2013
CN 103294113 A 9/2013
(Continued)

OTHER PUBLICATIONS

Office Action regarding Chinese Patent Application No. 201510590086.2, dated Jan. 2, 2018. Translation provided by Unitalen Attorneys at Law.

*Primary Examiner* — Kwin Xie
(74) *Attorney, Agent, or Firm* — Harness, Dickey & Pierce, P.L.C.

(57) ABSTRACT

An information processing method and an electronic device are provided. With the method and the electronic device, a sensing parameter generated in response to a deformation of the electronic device is acquired with a sensing component, the sensing parameter is processed, and it is acquired a processing result indicating a deformation state of a deformable portion of the electronic device during a deformation of the electronic device, the controllable component located on the second surface of the electronic device is activated and an operating mode corresponding to the controllable component is started up in a case where the processing result indicates that the deformation state of the deformable portion is the predetermined state. The deformable portion includes a deformation supporting component and a supporting portion of the flexible display screen corresponding to the deformation supporting component, the flexible display screen is located on the first surface of the electronic device.

18 Claims, 8 Drawing Sheets

(52) U.S. Cl.
CPC .......... *G06F 1/1681* (2013.01); *G06F 1/1686* (2013.01); *G06F 3/147* (2013.01); *G09G 3/20* (2013.01); *G06F 2203/04102* (2013.01); *G09G 2380/02* (2013.01)

(58) Field of Classification Search
USPC .................................. 345/173–174, 156–169
See application file for complete search history.

(56) References Cited

U.S. PATENT DOCUMENTS

| 2011/0234502 | A1* | 9/2011 | Yun | .......................... | G06F 3/016 |
| | | | | | 345/173 |
| 2013/0176248 | A1 | 7/2013 | Shin et al. | | |
| 2013/0229324 | A1* | 9/2013 | Zhang | ........................ | G09G 5/00 |
| | | | | | 345/1.3 |
| 2013/0278522 | A1 | 10/2013 | Kim | | |
| 2014/0015743 | A1* | 1/2014 | Seo | ........................ | G06F 1/1694 |
| | | | | | 345/156 |
| 2014/0029190 | A1* | 1/2014 | Sato | ........................ | G06F 1/1641 |
| | | | | | 361/679.27 |
| 2014/0101560 | A1* | 4/2014 | Kwak | .................... | G06F 1/1652 |
| | | | | | 715/738 |
| 2014/0240264 | A1* | 8/2014 | Im | ........................ | G06F 1/1652 |
| | | | | | 345/173 |
| 2014/0380186 | A1* | 12/2014 | Kim | ..................... | G09G 3/2092 |
| | | | | | 715/746 |
| 2015/0042674 | A1 | 2/2015 | Lin | | |
| 2015/0138103 | A1* | 5/2015 | Nishi | .................. | G02F 1/13452 |
| | | | | | 345/173 |
| 2015/0234433 | A1* | 8/2015 | Huang | .................. | G06F 1/1652 |
| | | | | | 361/679.26 |

FOREIGN PATENT DOCUMENTS

| CN | 104375737 A | 2/2015 |
| CN | 104572004 A | 4/2015 |

\* cited by examiner

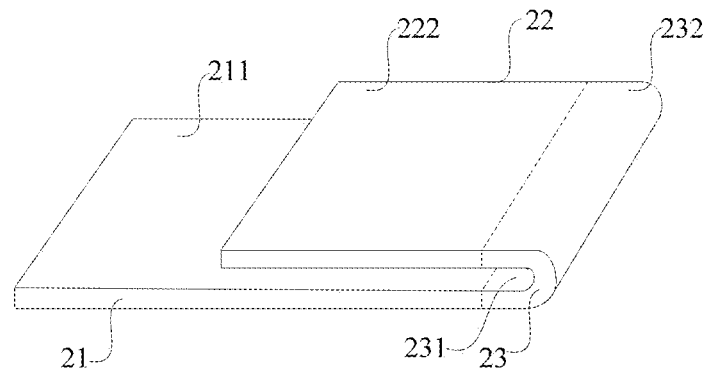
Figure 3
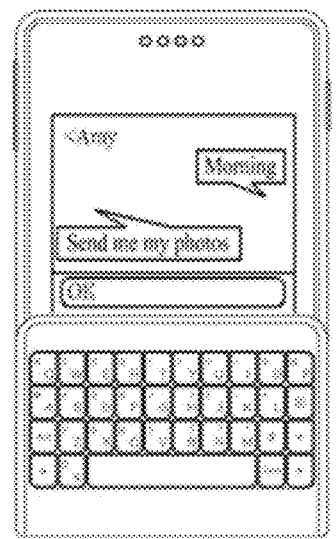 
Figure 4a          Figure 4b

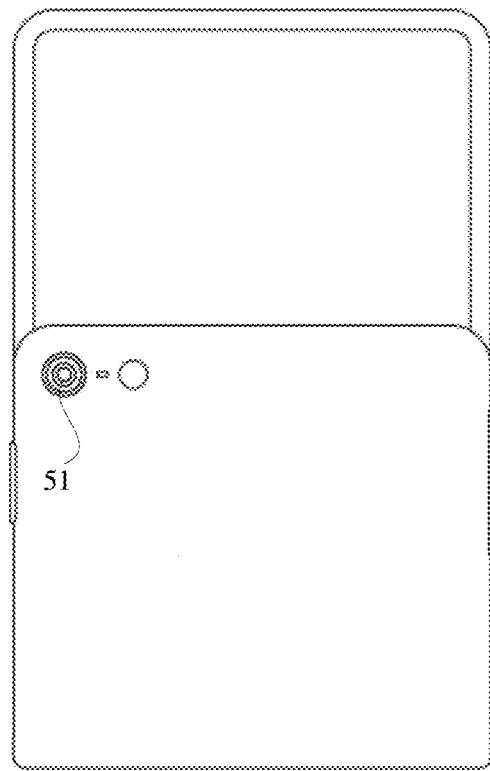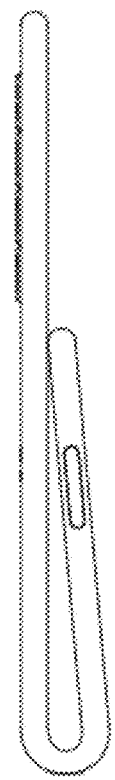
Figure 5a    Figure 5b
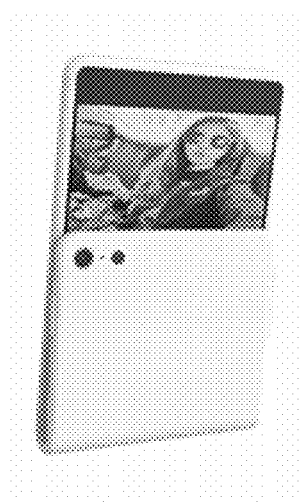
Figure 5c

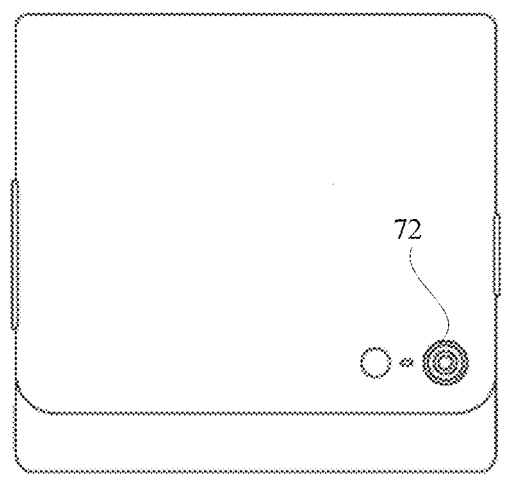
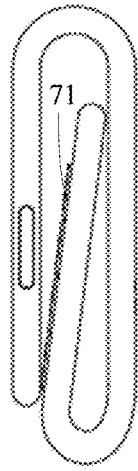
Figure 7a          Figure 7b
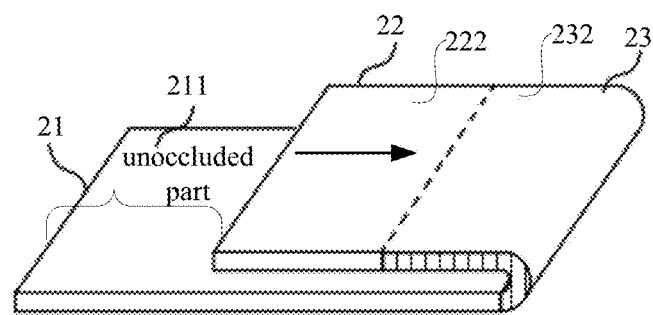
Figure 8a

INFORMATION PROCESSING METHOD AND ELECTRONIC DEVICE

CROSS REFERENCE OF RELATED APPLICATION

This application claims the priority to Chinese Patent Application No. 201510590086.2, entitled "INFORMATION PROCESSING METHOD AND ELECTRONIC DEVICE", filed with the Chinese State Intellectual Property Office on Sep. 16, 2015, which is incorporated by reference in its entirety herein.

FIELD

The present disclosure relates to the field of electronic technology, and in particular to an information processing method and an electronic device.

BACKGROUND

With rapid development of electronic technology, more and more applications are loadable in an electronic device. In this case, more operation steps need to be performed to implement some functions of the electronic device, resulting in complication in a user operation.

Therefore, it is desired to simplify the user operation.

SUMMARY

An object of the present disclosure is to provide an information processing method and an electronic device, to simplify a user operation.

In order to achieve the above object, the present disclosure provides the following technical solutions.

An information processing method includes:

acquiring a sensing parameter with a sensing assembly of an electronic device, where the sensing parameter is generated in response to a deformation of the electronic device;

processing the sensing parameter and obtaining a processing result, where the processing result indicates a deformation state of a deformable portion of the electronic device during a deformation of the electronic device, and the deformable portion includes a deformation supporting component and a supporting portion of a flexible display screen corresponding to the deformation supporting component, the flexible display screen is located on a first surface of the electronic device; and activating a controllable component located on a second surface of the electronic device and starting up a function mode corresponding to the controllable component, in a case where the processing result indicates that the deformation state of the deformable portion is a predetermined state.

In the above method, preferably, the electronic device may be divided, by the deformable portion, into a first body and a second body which are asymmetrical, with a volume of the second body being less than a volume of the first body; and the second body may be stacked with the first body to form a folded attitude of the electronic device in a case where the deformation state of the deformable portion is the predetermined state.

In the above method, preferably, the first surface may face away from the second surface, the first surface may include at least a first surface of the first body and a first surface of the second body, the second surface may include at least a second surface of the first body and a second surface of the second body, the controllable component may be located on the second surface of the second body, the first surface of the first body may correspond to a first portion of the flexible display screen, and the first surface of the second body may correspond to a second portion of the flexible display screen; and the first surface of the first body may face toward the first surface of the second body and the second surface of the first body may face away from the second surface of the second body, in a case where the second body is stacked with the first body.

In the above method, preferably, the controllable component may be an input component, and the starting up the function mode corresponding to the controllable component may include:

controlling to display a display content related to the input component on a rest of the first portion of the flexible display screen which is not occluded by the second portion.

In the above method, preferably, the input component may be a physical keyboard, and the controlling to display the display content related to the input component on the rest of the first portion of the flexible display screen which is not occluded by the second portion may include:

controlling to display a character input box on the rest of the first portion of the flexible display screen which is not occluded by the second portion;

or the input component may be a camera, and the controlling to display the display content related to the input component on the rest of the first portion of the flexible display screen which is not occluded by the second portion may include:

calling a photographic application; and controlling to display an interface corresponding to the photographic application on the rest of the first portion of the flexible display screen which is not occluded by the second portion, and to display an image acquired by the camera in a real time manner in the interface;

or the input component may be a touch input panel, and the controlling to display the display content related to the input component on the rest of the first portion of the flexible display screen which is not occluded by the second portion may include:

switching the electronic device from a first operating state to a second operating state, where a system power consumption of the electronic device in the second operating state is less than a system power consumption of the electronic device in the first operating state; and displaying M pieces of information received by the electronic device in the second operating state on the rest of the first portion of the flexible display screen which is not occluded by the second portion, with M being an integer greater than or equal to 1.

In the above method, preferably, the deformable portion may include a first deformable sub-portion and a second deformable sub-portion, and the electronic device may be divided, by the first deformable sub-portion and the second deformable sub-portion, into a first body, a second body and a third body which are asymmetrical;

the predetermined state may include a predetermined state of the first deformable sub-portion and a predetermined state of the second deformable sub-portion; where in a case where the deformation state of the deformable portion is the predetermined state of the first deformable sub-portion, the second body may be stacked with an entity formed by the first body and the third body to form a first folded attitude of the electronic device; and in a case where the deformation state of the deformable portion is the predetermined state of the second deformable sub-portion, the third body may be stacked with an entity formed by the first body and the second body to form a second folded attitude of the electronic device.

In the above method, preferably, the first surface may face away from the second surface, the first surface may include at least a first surface of the first body, a first surface of the second body and a first surface of the third body, the second surface may include at least a second surface of the first body, a second surface of the second body and a second surface of the third body, the controllable component may include at least a first controllable component and a second controllable component, the first controllable component may be located on the second surface of the second body, the second controllable component may be located on the second surface of the third body, the first surface of the first body may correspond to a first portion of the flexible display screen, the first surface of the second body may correspond to a second portion of the flexible display screen, and the first surface of the third body may correspond to a third portion of the flexible display screen;

in a case where the second body is stacked with the entity formed by the first body and the third body, the first surface of the second body may face toward the first surface of the first body and the second surface of the second body may face away from the second surface of the first body; and in a case where the third body is stacked with the entity formed by the first body and the second body, the first surface of the third body may face toward the first surface of the first body and the second surface of the third body may face away from the second surface of the first body.

In the above method, preferably, the electronic device may be divided, by the deformable portion, into a first body and a second body which are asymmetrical, with a volume of the second body being less than a volume of the first body, the first surface may face away from the second surface, the first surface may include at least a first surface of the first body and a first surface of the second body, the second surface may include at least a second surface of the first body and a second surface of the second body, the controllable component may be located on the second surface of the second body, the first surface of the first body may correspond to a first portion of the flexible display screen, and the first surface of the second body may correspond to a second portion of the flexible display screen;

the predetermined state may include a first predetermined state and a second predetermined state; where in a case where the deformation state of the deformable portion is the first predetermined state, the second body may be stacked with the first body to form a first folded attitude of the electronic device; or in a case where the deformation state of the deformable portion is the second predetermined state, the second body may be stacked with the first body to form a second folded attitude of the electronic device;

where in a case where the second body is stacked with the first body, the first surface of the first body may face toward the first surface of the second body, and the second surface of the first body may face away from the second surface of the second body; and an area of a rest of the first portion of the flexible display screen which is not occluded by the second portion in a case where the electronic device is in the first folded attitude may be less than an area of a rest of the first portion of the flexible display screen which is not occluded by the second portion in a case where the electronic device is in the second folded attitude.

In the above method, preferably, the controllable component may be a touch input panel operable in a trajectory input mode and a character input mode; and the activating the controllable component located on the second surface of the electronic device may include:

activating the touch input panel and setting the touch input panel to be in the trajectory input mode, in a case where the deformation state of the deformable portion is the first predetermined state; or activating the touch input panel and setting the touch input panel to be in the character input mode, in a case where the deformation state of the deformable portion is the second predetermined state.

Preferably, the above method may further include:

controlling to switch the touch input panel from the trajectory input mode to the character input mode in a case where the deformation state of the deformable portion is changed from meeting a first predetermined state deformation to meeting a second predetermined state deformation; and/or controlling to switch the touch input panel from the character input mode to the trajectory input mode in a case where the deformation state of the deformable portion is changed from meeting a second predetermined state deformation to meeting a first predetermined state deformation.

In the above method, preferably, the deformation supporting component of the deformable portion may include multiple rotating shafts, and the rotating shafts may provide frictional forces for simultaneous rotations or frictional forces for successive rotations.

An electronic device includes: a flexible display screen, a sensing assembly, a deformation supporting component, a controllable component and a processor, where the flexible display screen is located on a first surface of the electronic device and the controllable component is located on a second surface of the electronic device;

the processor is configured to acquire a sensing parameter with the sensing assembly, and to process the sensing parameter and obtain a processing result, where the processing result indicates a deformation state of a deformable portion of the electronic device during a deformation of the electronic device, and the deformable portion includes a deformation supporting component and a supporting portion of a flexible display screen corresponding to the deformation supporting component; and the processor is configured to activate the controllable component and start up a function mode corresponding to the controllable component, in a case where the processing result indicates that the deformation state of the deformable portion is a predetermined state.

In the above electronic device, preferably, the electronic device may be divided, by the deformable portion, into a first body and a second body which are asymmetrical, with a volume of the second body being less than a volume of the first body; and the second body may be stacked with the first body to form a folded attitude of the electronic device in a case where the deformation state of the deformable portion is the predetermined state.

In the above electronic device, preferably, the first surface may face away from the second surface, the first surface may include at least a first surface of the first body and a first surface of the second body, the second surface may include at least a second surface of the first body and a second surface of the second body, the controllable component may be located on the second surface of the second body, the first surface of the first body may correspond to a first portion of the flexible display screen, and the first surface of the second body may correspond to a second portion of the flexible display screen; and the first surface of the first body may face toward the first surface of the second body and the second surface of the first body may face away from the second surface of the second body, in a case where the second body is stacked with the first body.

In the above electronic device, preferably, the controllable component may be an input component, and the processor configured to start up the function mode corresponding to the controllable component may be configured to control to display a display content related to the input component on a rest of the first portion of the flexible display screen which is not occluded by the second portion.

In the above electronic device, preferably, the input component may be a physical keyboard, and the processor configured to display the display content related to the input component on the rest of the first portion of the flexible display screen which is not occluded by the second portion may be configured to:

control to display a character input box on the rest of the first portion of the flexible display screen which is not occluded by the second portion;

or the input component may be a camera, and the processor configured to display the display content related to the input component on the rest of the first portion of the flexible display screen which is not occluded by the second portion may be configured to:

call a photographic application, and control to display an interface corresponding to the photographic application on the rest of the first portion of the flexible display screen which is not occluded by the second portion, and to display an image acquired by the camera in a real time manner in the interface;

or the input component may be a touch input panel, and the processor configured to display the display content related to the input component on the rest of the first portion of the flexible display screen which is not occluded by the second portion may be configured to:

switch the electronic device from a first operating state to a second operating state, where a system power consumption of the electronic device in the second operating state is less than a system power consumption of the electronic device in the first operating state; and display M pieces of information received by the electronic device in the second operating state on the rest of the first portion of the flexible display screen which is not occluded by the second portion, with M being an integer greater than or equal to 1.

In the above electronic device, preferably, the deformable portion may include a first deformable sub-portion and a second deformable sub-portion, and the electronic device may be divided, by the first deformable sub-portion and the second deformable sub-portion, into a first body, a second body and a third body which are asymmetrical;

the predetermined state may include a predetermined state of the first deformable sub-portion and a predetermined state of the second deformable sub-portion; where in a case where the deformation state of the deformable portion is the predetermined state of the first deformable sub-portion, the second body may be stacked with an entity formed by the first body and the third body to form a first folded attitude of the electronic device; or in a case where the deformation state of the deformable portion is the predetermined state of the second deformable sub-portion, the third body may be stacked with an entity formed by the first body and the second body to form a second folded attitude of the electronic device.

In the above electronic device, preferably, the first surface may face away from the second surface, the first surface may include at least a first surface of the first body, a first surface of the second body and a first surface of the third body, the second surface may include at least a second surface of the first body, a second surface of the second body and a second surface of the third body, the controllable component may include at least a first controllable component and a second controllable component, the first controllable component may be located on the second surface of the second body, the second controllable component may be located on the second surface of the third body, the first surface of the first body may correspond to a first portion of the flexible display screen, the first surface of the second body may correspond to a second portion of the flexible display screen, and the first surface of the third body may correspond to a third portion of the flexible display screen;

in a case where the second body is stacked with the entity formed by the first body and the third body, the first surface of the second body may face toward the first surface of the first body and the second surface of the second body may face away from the second surface of the first body; and in a case where the third body is stacked with the entity formed by the first body and the second body, the first surface of the third body may face toward the first surface of the first body and the second surface of the third body may face away from the second surface of the first body.

In the above electronic device, preferably, the electronic device may be divided, by the deformable portion, into a first body and a second body which are asymmetrical, with a volume of the second body being less than a volume of the first body, the first surface may face away from the second surface, the first surface may include at least a first surface of the first body and a first surface of the second body, the second surface may include at least a second surface of the first body and a second surface of the second body, the controllable component may be located on the second surface of the second body, the first surface of the first body may correspond to a first portion of the flexible display screen, and the first surface of the second body may correspond to a second portion of the flexible display screen;

the predetermined state may include a first predetermined state and a second predetermined state; where in a case where the deformation state of the deformable portion is the first predetermined state, the second body may be stacked with the first body to form a first folded attitude of the electronic device; or in a case where the deformation state of the deformable portion is the second predetermined state, the second body may be stacked with the first body to form a second folded attitude of the electronic device;

where in a case where the second body is stacked with the first body, the first surface of the first body may face toward the first surface of the second body and the second surface of the first body may face away from the second surface of the second body; and an area of a rest of the first portion of the flexible display screen which is not occluded by the second portion in a case where the electronic device is in the first folded attitude may be less than an area of a rest of the first portion of the flexible display screen which is not occluded by the second portion in a case where the electronic device is in the second folded attitude.

In the above electronic device, preferably, the controllable component may be a touch input panel operable in a trajectory input mode and a character input mode; and the processor configured to the activate the controllable component may be configured to activate the touch input panel and set the touch input panel to be in the trajectory input mode in a case where the deformation state of the deformable portion is the first predetermined state, or to activate the touch input panel and set the touch input panel to be in the character input mode in a case where the deformation state of the deformable portion is the second predetermined state.

In the above electronic device, preferably, the processor may be further configured to: control to switch the touch input panel from the trajectory input mode to the character input mode in a case where the deformation state of the deformable portion is changed from meeting a first predetermined state deformation to meeting a second predetermined state deformation; and/or control to switch the touch input panel from the character input mode to the trajectory input mode in a case where the deformation state of the deformable portion is changed from meeting the second predetermined state deformation to meeting the first predetermined state deformation.

In the above electronic device, preferably, the deformation supporting component of the deformable portion may include multiple rotating shafts, and the rotating shafts provide frictional forces for simultaneous rotations or frictional forces for successive rotations.

It can be seen from the above solutions that, with the information processing method and the electronic device according to the present disclosure, the sensing parameter generated in response to the deformation of the electronic device is acquired with the sensing component, the sensing parameter is processed, and it is acquired the processing result indicating the deformation state of the deformable portion of the electronic device during a deformation of the electronic device, and the controllable component located on the second surface of the electronic device is activated and an operating mode corresponding to the controllable component is started up in a case where the processing result indicates that the deformation state of the deformable portion is the predetermined state. The deformable portion includes the deformation supporting component and the supporting portion of a flexible display screen corresponding to the deformation supporting component, the flexible display screen is located on the first surface of the electronic device. That is to say, the electronic device according the embodiment of the present disclosure is a flexible electronic device. Some functions, i.e. functions related to the controllable components, of the electronic device may be triggered automatically as long as the shape of the electronic device is changed by the user, thereby simplifying the user operation.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

FIG. 3 is an exemplary diagram of an electronic device shown in FIG. 2 in a case where a deformation state of a deformable portion of the electronic device is a predetermined state according to an embodiment of the present disclosure;

FIG. 4a is an exemplary diagram of an application of an electronic device in which an input component is a physical keyboard according to an embodiment of the present disclosure;

FIG. 4b is a right view of the electronic device shown in FIG. 4a according to an embodiment of the present disclosure;

FIG. 5a is an exemplary diagram of an application of an electronic device in which an input component is a camera according to an embodiment of the present disclosure;

FIG. 5b is a left view of the electronic device shown in FIG. 5a according to an embodiment of the present disclosure;

FIG. 5c is an exemplary diagram in which a shot photo is displayed with the electronic device shown in FIG. 5a according to an embodiment of the present disclosure;

FIG. 7a is a front view of an electronic device in a third folded attitude in which a first controllable component and a second controllable component are respectively a physical keyboard and a camera according to an embodiment of the present disclosure;

FIG. 7b is a right view of the electronic device shown in FIG. 7a according to an embodiment of the present disclosure;

FIG. 8a is a schematic diagram of an electronic device in a case where a deformation state of a deformable portion is a first predetermined state according to an embodiment of the present disclosure;

The terms 'first', 'second', 'third', 'fourth' and the like (if any) in the description and the claims, are used for distinguishing between similar parts and not necessarily for describing a particular sequential or chronological order. It should be understood that the data used in this way are interchangeable under appropriate circumstances and the embodiments of the disclosure described herein can be implemented in sequences other than those illustrated herein.

DETAILED DESCRIPTION

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

Figure 1:
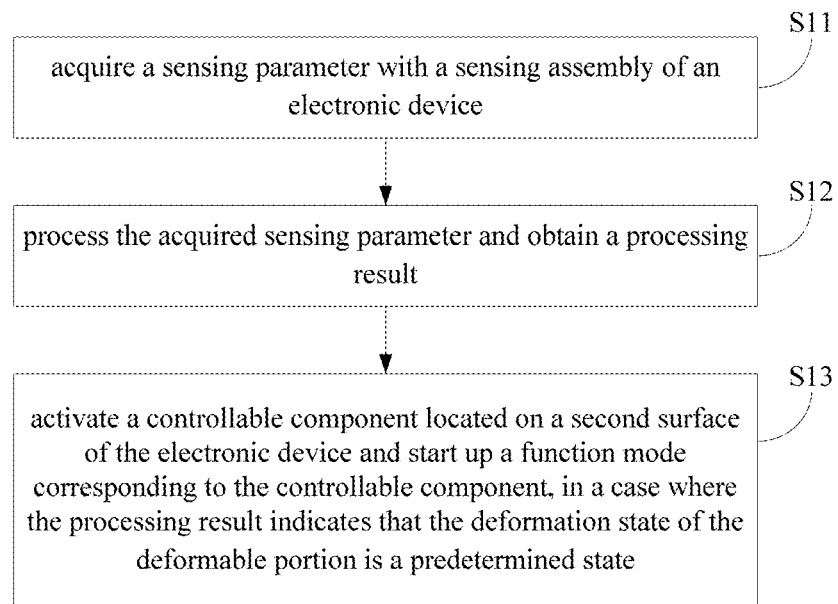
FIG. 1 is a flowchart of an implementation of an information processing method according to an embodiment of the present disclosure.

Reference is made to FIG. 1, which is a flowchart of an implementation of an information processing method according to an embodiment of the present disclosure. The method may include following steps S11 to S13.

In step S11, a sensing parameter generated in response to a deformation of an electronic device is acquired with a sensing assembly of an electronic device.

The sensing assembly may include any one or any combination of a light-sensitive sensor, an angle sensor, a gravity sensor, a gyroscope and the like. Practically, in an embodiment of the present disclosure, the sensing assembly may include other sensing assemblies, as long as a sensing parameter can be acquired with the sensing assembly when an electronic device is deformed. For example, the sensing assembly may include a bending sensor.

In an embodiment of the present disclosure, the electronic device is a flexible electronic device which is deformable under an effect of an external force.

In step S12, the acquired sensing parameter is processed to obtain a processing result. The processing result indicates a deformation state of a deformable portion of the electronic device during a deformation of the electronic device. The deformable portion includes a deformation supporting component and a supporting portion of a flexible display screen corresponding to the deformation supporting component, and the flexible display screen is located on a first surface of the electronic device.

The deformable portion may be a bendable portion of the electronic device with a rotating shaft. The deformation supporting component may include the rotating shaft to support the deformable portion to remain in a deformation state in a case of a deformation. And the supporting portion corresponding to the deformation supporting component is a portion of the flexible display screen.

Surfaces of the electronic device other than the first surface may be a flexible display screen, or may be formed by other flexible plates, such as a rubber plate.

In step S13, a controllable component located on a second surface of the electronic device is activated and a function mode corresponding to the controllable component is started up, in a case where the acquired processing result indicates that the deformation state of the deformable portion is a predetermined state. The first surface and the second surface are different surfaces of the electronic device.

In the information processing method according to an embodiment of the present disclosure, the sensing parameter generated in response to a deformation of the electronic device is acquired with the sensing assembly. The sensing parameter is processed to obtain a processing result. The processing result indicates the deformation state of the deformable portion of the electronic device during a deformation of the electronic device. The controllable component located on the second surface is activated and the operating mode corresponding to the controllable component is started up, in a case where the processing result indicates that the deformation state of the deformable portion is the predetermined state. Where the deformable portion includes a deformation supporting component and a supporting portion of a flexible display screen corresponding to the deformation supporting component, and the flexible display screen is located on the first surface of the electronic device. That is to say, in the embodiment of the present disclosure, the electronic device is a flexible electronic device. Some functions of the electronic device may be triggered automatically as long as the shape of the electronic device is changed by the user, thereby simplifying a user operation.

Figure 2:
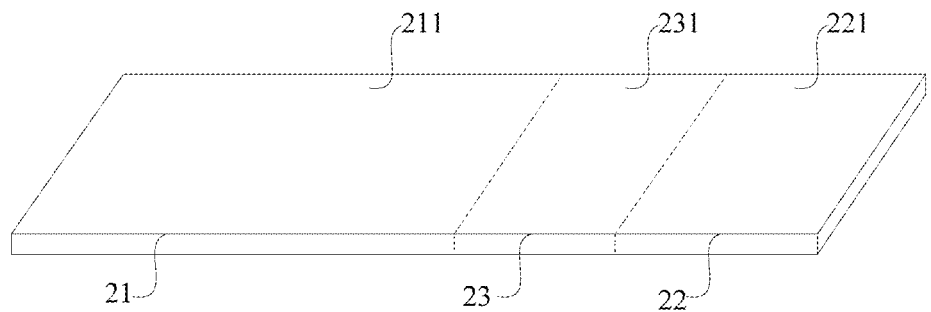
FIG. 2 is an exemplary diagram of an electronic device in a flat attitude according to an embodiment of the present disclosure.

Reference is made to FIG. 2, which is an exemplary diagram of an electronic device in a flat attitude according to an embodiment of the present disclosure. An electronic device is divided, by a deformation portion 23, into a first body 21 and a second body 22 which are asymmetrical, with a volume of the second body being less than a volume of the first body. The second body 22 is stacked with the first body 21 to form a folded attitude of the electronic device in a case where a deformation state of a deformable portion 23 is a predetermined state.

Dashed lines in FIG. 2 and subsequent figures are used for distinguishing between different regions of the electronic device.

FIG. 3 is an exemplary diagram of the electronic device shown in FIG. 2 in a case where the deformation state of the deformable portion of the electronic device is the predetermined state, according to an embodiment of the present disclosure.

In order to facilitate understanding of the embodiment of the present disclosure, the flat attitude of the electronic device may be set as an original attitude, i.e. an attitude of the electronic device before the deformation.

In an embodiment of the present disclosure, it may be determined whether the deformation state of the deformable portion 23 is the predetermined state in the following ways.

In a first way, a sensing assembly may be a bending sensor or a bending sensor array. The bending sensor is arranged at the deformable portion 23. An electric resistance value of an electric-resistive material on a surface of the bending sensor increases as a bending degree of the bending sensor increases. Thus, an electric resistance value outputted by the bending sensor may be processed to determine a bending angle of the bending sensor, i.e. a bending angle of the deformable portion. Then it may be determined whether the deformable portion 23 is in the predetermined state based on the bending angle of the deformable portion.

In a second way, the sensing assembly includes several photosensitive units (such as a light-sensitive sensor). The photosensitive units are arranged on a side of the electronic device on which the flexible display screen is located (for example, the photosensitive units may be arranged around the flexible display screen). In a case where the electronic device is in a folded attitude, a second portion occludes some of the photosensitive units, thereby reducing a light intensity sensed by the occluded sensing unit. That is to say, when decreased amplitude of a light intensity of the photosensitive unit is greater than a predetermined threshold, it indicates that the photosensitive unit is occluded. Therefore, whether the deformable portion 23 is in the predetermined state may be determined by determining which photosensitive units are occluded.

In a third way, the sensing assembly may be an angle sensor. The angle sensor or angle sensor array may be arranged at the deformable portion 23. And whether the deformable portion 23 is in the predetermined state may be determined by detecting a deformation angel in a deformation of the deformable portion 23.

In a fourth way, the sensing assembly may be a gravity sensor and/or a gyroscope. The gravity sensor and/or gyroscope may be arranged on the second body 22. In a case where the deformable portion 23 is deformed, a user generally performs an operation on the second body 22 to move the second body 22 with respect to the first body 21. In this case, amplitude and a trajectory with which the second body 22 moves with respect to the first body 21 may be determined with the gravity sensor and/or the gyroscope, and it is thus determined whether the deformable portion 23 is in the predetermined state.

Referring to FIGS. 2 and 3, the first surface of the electronic device faces away from the second surface of the electronic device. That is, in a case where the electronic device is in a flat state, the first surface and the second surface are two parallel surfaces of the electronic device. The first surface includes at least a first surface of the first body and a first surface of the second body. As shown in FIG. 2, the first surface includes a first surface 211 of the first body 21, a first surface 221 of the second body 22 and a first surface 231 of the deformable portion 23. The second surface includes at least a second surface of the first body and a second surface of the second body. In the embodiments shown in FIGS. 2 and 3, the second surface includes a second surface (not shown in the figures) of the first body 21, a second surface 222 of the second body 22 and a second surface 232 of the deformable portion. The first surface of the first body 21 faces away from the second surface of the first body 21, the first surface of the second body 22 faces away from the second surface of the second body 22, and the first surface of the deformable portion 23 faces away from the second surface of the deformable portion 23.

A controllable component is located on the second surface 222 of the second body 22. The first surface 211 of the first body 21 corresponds to a first portion of the flexible display screen, the first surface 221 of the second body 22 corresponds to a second portion of the flexible display screen, and the first surface 231 of the deformable portion 23 corresponds to a third portion (i.e. the supporting portion corresponding to the deformable portion 23 described above) of the flexible display screen. That is, the flexible display screen includes the first portion, the second portion and the third portion described above.

In a case where the second body 22 is stacked with the first body 21, the first surface 211 of the first body 21 faces toward the first surface 221 of the second body 22 and the second surface of the first body 21 faces away from the second surface 222 of the second body 22.

In other words, during stacking of the second body 22 with the first body 21 due to a deformation of the deformable portion 23, the first surface 211 of the first body 21 and the first surface 221 of the second body 22 approach to each other.

The controllable component may be an input component. The starting up the function mode corresponding to the controllable component may include: controlling to display a display content related to the input component on a rest of the first portion of the flexible display screen which is not occluded by the second portion.

In a case where the first body 21 is stacked with the second body 22, a portion of flexible display screen on the first body may be occluded by the second body 22 and can not be seen by the user. In an embodiment of the present disclosure, the display content related to the input component is displayed on a portion of the flexible display screen on the first body 21 which is not occluded by the second body 22.

The input component may be a physical keyboard. The controlling to display the display content related to the input component on the rest of the first portion of the flexible display screen which is not occluded by the second portion may include: controlling to display a character input box on the rest of the first portion of the flexible display screen which is not occluded by the second portion. The character input box may be input with a character and/or a symbol.

In a case where the deformation state of the deformable portion is the predetermined state, if a character input box exists in a current display interface, a cursor is input and displayed in the character input box directly. If the character input box is not on the rest of the first portion of the flexible display screen which is not occluded by the second portion, the character input box is moved onto the rest of the first portion of the flexible display screen which is not occluded by the second portion. If there is no character input box in the current display interface, a character input box is generated and displayed on the rest of the first portion of the flexible display screen which is not occluded by the second portion, and a cursor is displayed in the character input box. That is to say, in an embodiment, when the deformation state of the deformable portion is the determined state, it indicates that the user is to input information.

In any application, a keyboard inputting can be performed only if there is a character input box. For example, in an application interface of Wechat, a keyboard can be displayed for inputting only if a user clicks a character input box. In an embodiment of the present disclosure, a physical keyboard may be activated, i.e. an information inputting mode is started up, as long as the deformation state of the deformable portion is the predetermined state (such as a state in which the first body 21 is stacked with the second body 22). A new approach for starting up the information input mode is provided. In a conventional approach for starting up the information input mode, a user needs to find a character input box firstly, and can input content after clicking the input box. In the embodiment of the present disclosure, the information input mode is started up as long as the shape of the electronic device is changed by the user (such as by bending the second body toward the first body), thereby simplifying a user operation.

FIG. 4a is an exemplary diagram of an application (session) of an electronic device in which an input component is a physical keyboard according to an embodiment of the present disclosure. In the figure, a box in which 'OK' is located is a character input box, and a display region for displaying a content of the session is above the character input box.

FIG. 4b is a right view of the electronic device shown in FIG. 4a.

Alternatively, the input component may be a camera. And the controlling to display the display content related to the input component on the rest of the first portion of the flexible display screen which is not occluded by the second portion may include:

calling and starting a photographic application, i.e. calling the photographic application to activate the camera; and controlling to display an interface corresponding to the photographic application on the rest of the first portion of the flexible display screen which is not occluded by the second portion and to display an image acquired by the camera in real time in the interface.

Generally, if a user wants to take a picture, he/she firstly finds out the photographic application, and then activates the camera by clicking an icon of the photographic application. In an embodiment of the present disclosure, the photography mode is started up as long as the shape of the electronic device is changed (such as bending the second body toward the first body), thereby simplifying the user operation.

FIG. 5a is an exemplary diagram of an application of an electronic device in which an input component is a camera 51 according to an embodiment of the present disclosure. FIG. 5b is a left view of the electronic device shown in FIG. 5a, and FIG. 5c is an exemplary diagram in which a shoot photo is displayed by the electronic device.

Alternatively, the input component may be a touch input panel. And the controlling to display the display content related to the input component on the rest of the first portion of the flexible display screen which is not occluded by the second portion may include:

switching the electronic device from a first operating state to a second operating state, where a system power consumption of the electronic device in the second operating state is less than a system power consumption of the electronic device in the first o operating state; and displaying M pieces of information received by the electronic device in the second operating state on the rest of the first portion of the flexible display screen which is not occluded by the second portion, with M being an integer greater than or equal to 1.

In the embodiment, the electronic device is switched into a low power consumption state such as a switched-off screen state, in a case where a deformation state of the deformable portion is a predetermined state.

In the second operating state, M pieces of information, after being received, are displayed on the rest of the first portion of the flexible display screen which is not occluded by the second portion. The M pieces of information may be displayed piece by piece, and the user may switch between the pieces of information to browse by performing a preset operation (such as scrolling left and scrolling right) on the touch input panel. Alternatively, the M pieces of information may be displayed in an overall way. In a case where the rest of the first portion of the flexible display screen which is not occluded by the second portion is not enough to display all pieces of information in one time, some of the M pieces of information may be displayed firstly, and the user may switch between the pieces of information by performing a preset operation (such as scrolling left and scrolling right) on the touch input panel, to browse pieces of information which are not displayed.

Figure 6A:
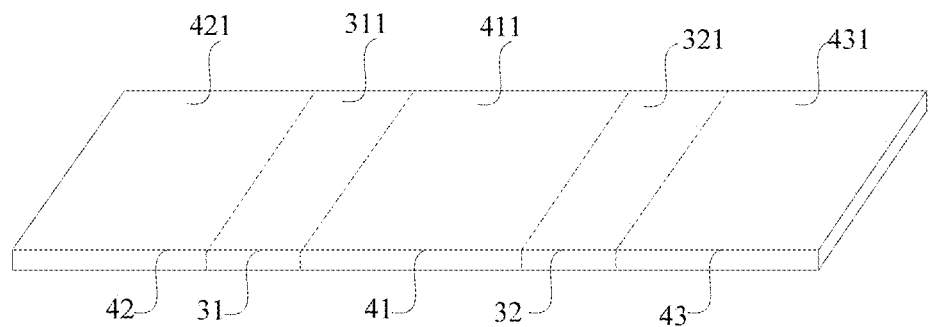
FIG. 6a is an exemplary diagram of an electronic device in a flat attitude according to an embodiment of the present disclosure.

FIG. 6a is an exemplary diagram of an electronic device in a flat attitude according to an embodiment of the present disclosure. The deformable portion 23 includes a first deformable sub-portion 31 and a second deformable sub-portion 32, by which the electronic device is divided into a first body 41, a second body 42 and a third body 43 which are asymmetrical.

A predetermined state includes a predetermined state of the first deformable sub-portion 31 and a predetermined state of a second deformable sub-portion.

Figure 6B:
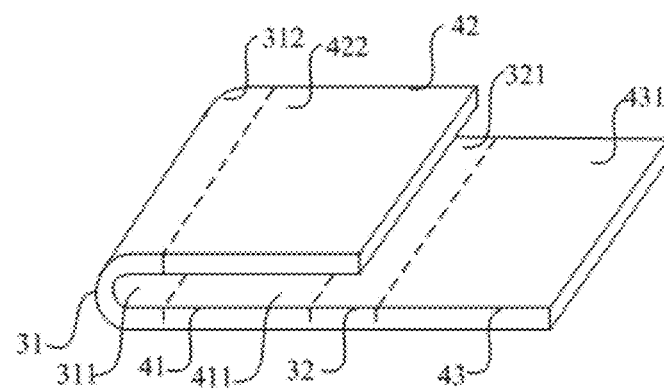
FIG. 6b is an exemplary diagram of an electronic device in a first folded attitude according to an embodiment of the present disclosure.

In a case where the deformation state of the deformable portion 23 is the predetermined state of the first deformable sub-portion 31, the second body 42 is stacked with an entity formed by the first body 41 and the third body 43 to form a first folded attitude of the electronic device. FIG. 6b is an exemplary diagram of an electronic device in the first folded attitude. A volume of the second body 42 is less than a sum of a volume of the first body 41 and a volume of the third body 43.

Figure 6C:
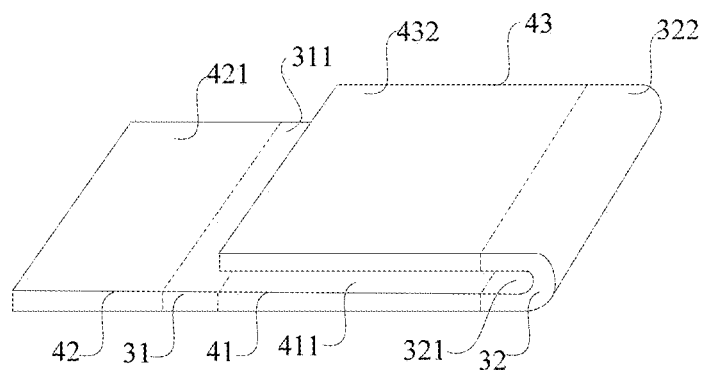
FIG. 6c is an exemplary diagram of an electronic device in a second folded attitude according to an embodiment of the present disclosure.

In a case where the deformation state of the deformable portion 23 is the predetermined state of the second deformable sub-portion 32, the third body 43 is stacked with an entity formed by the first body 41 and the second body 42 to form a second folded state of the electronic device. FIG. 6c is an exemplary diagram of an electronic device in the second folded state. The volume of the third body 43 is less than a sum of a volume of the first body 41 and a volume of the second body 42.

In the embodiments shown in FIGS. 6b and 6c, only the first deformable sub-portion 31 of the deformable portion 23 is in the predetermined state, or only the second deformable sub-portion 32 of the deformable portion 23 is in the predetermined state.

Figure 6D:
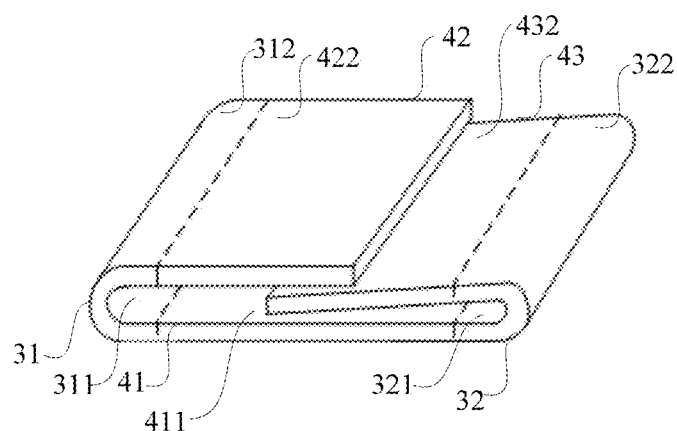
FIG. 6d is an exemplary diagram of an electronic device in a third folded attitude according to an embodiment of the present disclosure.

In a case where the first deformable sub-portion 31 and the second deformable sub-portion 32 of the deformable portion 23 are in the respective predetermined states, the electronic device is in a third folded attitude. FIG. 6d is an exemplary diagram of an electronic device in the third folded attitude.

References are made to FIGS. 6a to 6c. A first surface and a second of the electronic device face away from each other. That is, in a case where the electronic device is in a flat state, the first surface and the second surface are two parallel surfaces of the electronic device. The first surface includes at least a first surface 411 of the first body 41, a first surface 421 of the second body 42 and a first surface 431 of the third body 43. As shown in FIG. 6a, the first surface includes the first surface 411 of the first body 41, the first surface 421 of the second body 42, the first surface 431 of the third body 43, a first surface 311 of the first deformable sub-portion 31 and a first surface 321 of the second deformation sub-portion 32. The second surface includes at least a second surface (not shown) of the first body 41, a second surface 422 of the second body 42 and a second surface 432 of the third body 43. In the embodiments as shown in FIGS. 6b and 6c, the second surface includes the second surface of the first body 41, the second surface 422 of the second body 42, the second surface 432 of the third body 43, a second surface 312 of the first deformable sub-portion 31 and a second surface 322 of the second deformable sub-portion 32. The first surface of the first body 41 faces away from the second surface of the first body 41, the first surface of the second body 42 faces away from the second surface of the second body 42, the first surface of the third body 43 faces away from the second surface of the third body 43, the first surface of the first deformable sub-portion 31 faces away from the second surface of the first deformation sub-portion 31, and the first surface of the second deformable sub-portion 32 faces away from the second surface of the second deformable sub-portion 32.

A controllable component includes at least a first controllable component and a second controllable component. The first controllable component is located on the second surface 422 of the second body 42, and the second controllable component is located on the second surface 432 of the third body 43. The first surface 411 of the first body 41 corresponds to a first portion of the flexible display screen, the first surface 421 of the second body 42 corresponds to a second portion of the flexible display screen, and the first surface 431 of the third body 43 corresponds to a third portion of the flexible display screen. The first surface 311 of the first deformable sub-portion 31 corresponds to a fourth portion of the flexible display screen, and the first surface 321 of the second deformation sub-portion 32 corresponds to a fifth portion of the flexible display screen. The fourth portion and the fifth portion of the flexible display screen form the above supporting portion corresponding to the deformable portion 23. In other words, the above supporting portion corresponding to the deformable portion 23 includes a first supporting sub-portion and a second supporting sub-portion, which are respectively the fourth portion and the fifth portion of the flexible display screen. That is to say, the flexible display screen includes the first portion, the second portion, the third portion, the fourth portion and the fifth portion described above.

In a case where the second body 42 is stacked with the entity formed by the first body 41 and the third body 43 (as shown in FIG. 6b), the first surface 421 of the second body 42 faces toward the first surface 411 of the first body 41, and the second surface 422 of the second body 42 faces away from the second surface of the first body 41.

That is to say, during stacking of the second body 42 with the entity formed by the first body 41 and the third body 43 due to a deformation of the first deformable sub-portion 31, the first surface 421 of the second body 42 and the first surface 411 of the first body 41 approach to each other.

In a case where the third body 43 is stacked with the entity formed by the first body 41 and the second body 42 (as shown in FIG. 6c), the first surface 431 of the third body 43 faces toward the first surface 411 of the first body 41, and the second surface 432 of the third body 43 faces away from the second surface of the first body 41.

That is to say, during stacking of the third body 43 with the entity formed by the first body 41 and the second body 42 due to a deformation of the second deformable sub-portion 32, the first surface 431 of the third body 43 and the first surface 411 of the first body 41 approach to each other.

The controllable component may be an input component, and the starting up the function mode corresponding to the controllable component may include: controlling to display a display content related to the input component located on the second surface of the second body 42 on the rest of the flexible display screen which is not occluded by the second portion in a case where the second body 42 is stacked with the entity formed by the first body 41 and the third body 43; and controlling to display a display content related to the input component located on the second surface of the third body 43 on the rest of the flexible display screen which is not occluded by the third portion in a case where the third body 43 is stacked with the entity formed by the first body 41 and the second body 42.

In a case where the second body 42 is stacked with the entity formed by the first body 41 and the third body 43 (as shown in FIG. 6b), a portion of a flexible display screen on the entity formed by the first body 41 and the third body 43 may be occluded by the second body 42 and can not be seen by the user. In an embodiment of the present disclosure, the display content related to the input component is displayed on the flexible display screen on the entity formed by the first body 41 and the third body 43 which is not occluded by the second body 42.

In a case where the third body 43 is stacked with the entity formed by the first body 41 and the second body 42 (as shown in FIG. 6c), a portion of a flexible display screen on the entity formed by the first body 41 and the second body 42 may be occluded by the third body 43 and can not be seen by the user. In an embodiment of the present disclosure, a display content related to the input component is displayed on the flexible display screen on the entity formed by the first body 41 and the second body 42 which is not occluded by the third body 43.

The first controllable component may be a first input component such as a physical keyboard or a touch input panel, and the second controllable component may be a second input component such as a camera.

In a case where the first input component is the physical keyboard, the controlling to display the display content related to the first input component on the rest of the flexible display screen which is not occluded by the second portion may include: controlling to display a character input box on the rest of the flexible display screen which is not occluded by the second portion.

The character input box may be input with a character and/or a symbol.

In a case where a deformation state of the first deformable sub-portion is the predetermined state, if a character input box exists in a current display interface, a cursor is directly displayed in the character input box. If the character input box is not displayed on the rest of the flexible display screen which is not be occluded by the second portion, the character input box is moved to the rest of the flexible display screen which is not occluded by the second portion. If there is no character input box in the current display interface, a character input box is generated and displayed on the rest of the flexible display screen which is not occluded by the second portion for displaying a cursor. That is to say, when the deformation state of the deformable portion is the predetermined state, it indicates that the user is to input information.

In a case where the first input component is the touch input panel, the controlling to display a display content related to the first input component on the rest of the flexible display screen which is not occluded by the second portion may include:

switching the electronic device from a first operating state to a second operating state, where a system power consumption of the electronic device in the second operating state is less than a system power consumption of the electronic device in the first operating state; and displaying M pieces of information received by the electronic device in the second operating mode on the rest of the flexible display screen which is not occluded by the second portion, with M being an integer greater than or equal to 1.

In the embodiment, the electronic device is switched into a low power consumption state such as a switched-off screen state, in a case where the deformation state of the deformable portion is the predetermined state.

In the second operating state, M pieces of information, after being received, are displayed on the rest of the flexible display screen which is not occluded by the second portion. The M pieces of information may be displayed piece by piece, and the user may switch between the pieces of information to browse by performing a preset operation (such as scrolling left and scrolling right) on the touch input panel. Alternatively, the M pieces of information may be displayed in an overall way. In a case where the rest of the flexible display screen which is not occluded by the second portion is not enough to display all pieces of information in one time, some of the M pieces of information may be displayed firstly, and the user may switch between the pieces of information by performing a preset operation (such as scrolling left and scrolling right) on the touch input panel, to browse pieces of information which are not displayed.

In a case where the second input component is a camera, the controlling to display a display content related to the second input component on the rest of the flexible display screen which is not occluded by the third portion may include:

calling and starting a photographic application, i.e. calling the photographic application to activate the camera; and controlling to display an interface corresponding to the photographic application on the rest of the flexible display screen which is not occluded by the third portion and to display an image acquired by the camera in real time in the interface.

In a case where the first deformable sub-portion and the second sub deformable sub-portion are in the respective predetermined states, the electronic device is switched from the first operating state to the second operating state (such as the switched-off screen state), and the first and second controllable components are switched off. The system power consumption of the electronic device in the second operating state is less than the system power consumption of the electronic device in the first operating state.

When the first deformable sub-portion and the second deformable sub-portion are in the respective predetermined states, it indicates that the user does not use the electronic device temporarily.

FIG. 7a is a front view of an electronic device in a third folded attitude in which the first controllable component and the second controllable component are respectively a physical keyboard 71 and a camera1 72 according to an embodiment of the present disclosure, and FIG. 7b is a right view of the electronic device shown in FIG. 7a.

The electronic device is divided by the deformable portion 23 into a first body 21 and a second body 22 which are asymmetrical, with a volume of the second body 22 being less than a volume of the first body 21. A first surface faces away from a second surface. The first surface includes at least a first surface of the first body 21 and a first surface of the second body 22. That is, the first surface includes the first surface of the first body 21, the first surface of the second body 22 and a first surface of the deformable portion 23. The second surface includes at least a second surface of the first body 21 and a second surface of the second body 22. That is, the second surface includes the second surface of the first body 21, the second surface of the second body 22 and a second surface of the deformable portion 23. A controllable component is located on the second surface of the second body 22. The first surface of the first body corresponds to a first portion of a flexible display screen, the first surface of the second body corresponds to a second portion of the flexible display screen and the first surface of the deformable portion 23 corresponds to a third portion of the flexible display screen. That is, the flexible display screen includes the first surface of the first body, the first surface of the second body and the first surface of the deformable portion 23.

The embodiment of the present disclosure is different from the embodiment shown in FIG. 2 in that: a predetermined state of the deformable portion 23 includes a first predetermined state and a second predetermined state.

In a case where a deformation state of the deformable portion is the first predetermined state, the second body 22 is stacked with the first body 21 to form a first folded attitude of the electronic device. FIG. 8a is a schematic diagram of an electronic device in a case where the deformation state of the deformable portion is the first predetermined state according to an embodiment of the present disclosure.

Figure 8B:
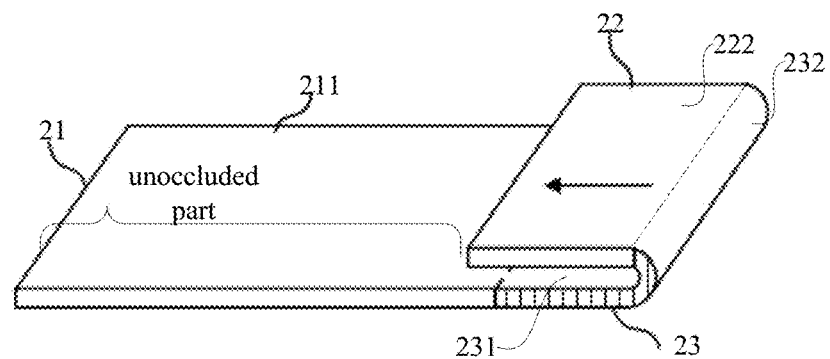
FIG. 8b is a schematic diagram of an electronic device in a case where a deformation state of a deformable portion is a second predetermined state according to an embodiment of the present disclosure.

In a case where the deformation state of the deformable portion is the second predetermined state, the second body 22 is stacked with the first body 21 to form a second folded state of the electronic device. FIG. 8b is a schematic diagram of an electronic device in a case where the deformation state of the deformable portion is the second predetermined state according to an embodiment of the present disclosure.

In a case where the second body 22 is stacked with the first body 21, the first surface of the first body 21 faces toward the first surface of the second body, and the second surface of the first body 21 faces away from the second surface of the second body 22; and an area of a rest of the first portion of the flexible display screen which is not occluded by the second portion in a case where the electronic device is in the first folded state is less than an area of a rest of the first portion of the flexible display screen which is not occluded by the second portion in a case where the electronic device is in the second folded state.

As shown in FIG. 8a, in the case where the electronic device is in the first folded attitude, the second body 22 is moved in a direction indicated by the arrow, so that the electronic device goes into the second folded attitude shown in FIG. 8b. As shown in FIG. 8b, in a case where the electronic device is in the second folded attitude, the second body 22 is moved in a direction indicated by the arrow, so that the electronic device goes into the first folded attitude shown in FIG. 8a.

The controllable component may be a touch input panel operable in a trajectory input mode (such as a handwriting mode) and a character input mode (such as a virtual keyboard input mode).

The activating the controllable component located on the second surface of the electronic device may include:

activating the touch input panel and setting the touch input panel to be in the trajectory input mode, in a case where the deformation state of the deformable portion is the first predetermined state; or activating the touch input panel and setting the touch input panel to be in the character input mode, in a case where the deformation state of the deformable portion is the second predetermined state.

In an embodiment of the present disclosure, different input modes of the touch input panel are activated based on different deformation states of the deformable portion. That is to say, the input mode of the touch input panel may be changed as long as a location of the second body with respect to the first body is changed by the user.

The touch input panel is controlled to switch from the trajectory input mode to the character input mode in a case where the deformation state of the deformable portion is changed from meeting a first predetermined state deformation to meeting a second predetermined state deformation (for example, deforming from the attitude shown in FIG. 8a to the attitude shown in FIG. 8b).

Additionally or alternatively, the touch input panel is controlled to switch the touch input panel from the character input mode to the trajectory input mode in a case where the deformation state of the deformable portion is changed from meeting a second predetermined state deformation to meeting a first predetermined state deformation (for example, deforming from the attitude shown in FIG. 8b to the attitude shown in FIG. 8a).

In an embodiment of the present disclosure, the input mode of the touch input panel is switched in response to switching of the deformation state of the deformable portion from a predetermined state to another predetermined state.

A deformation supporting component of the deformable portion may include multiple rotating shafts which provide frictional forces for simultaneous rotations or frictional forces for successive rotations.

Figure 9:
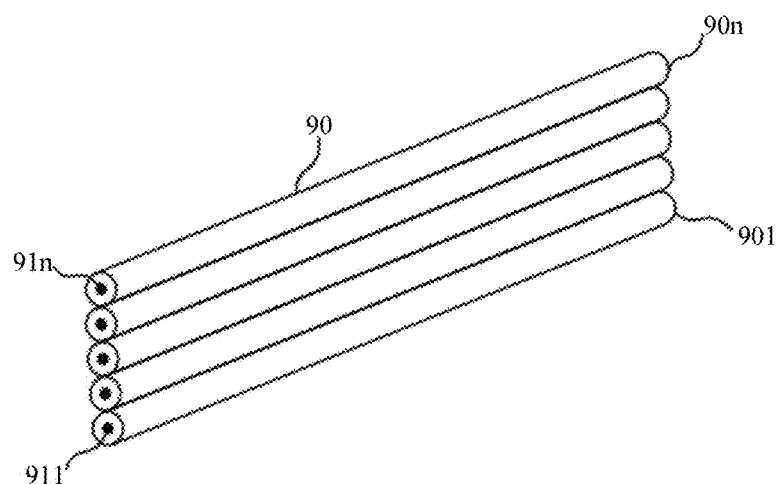
FIG. 9 is a schematic structural diagram of a supporting component of a deformable portion according to an embodiment of the present disclosure.

FIG. 9 is a schematic structural diagram of a supporting component of a deformable portion according to an embodiment of the present disclosure. The supporting component may include at least three rotatable components 901 to 90*n* (n is an integer greater than or equal to 3). The at least three rotatable components 901 to 90*n* each have one self-rotating shaft, which are respectively 911 to 91*n*, and the respective self-rotating shafts 911 to 91*n* of the at least three rotatable components 901 to 90*n* are parallel to one another. For example, in a case where a component, in a direction perpendicular to the self-rotating shaft 911 and tangent to an outer surface of the rotatable component 901, of an external force applied to a rotatable component 901 meets a predetermined force application condition, the rotatable component 901 rotates about the self-rotating shaft 911. Here, the predetermined force application condition is related to conditions such as manufacture material and a manufacture process of the above at least three rotatable components 901 to 90*n*. In addition, in a case where there is no external force meeting the predetermined force application condition on any one of the at least three rotatable components 901 to 90*n*, the above at least three rotatable components 901 and 90*n* may be maintained steady with respect to one another due to a damp, thereby ensuring a relative steady state between the first body 21, the second body 22 and the deformable portion 23 of the electronic device.

Figure 10A:
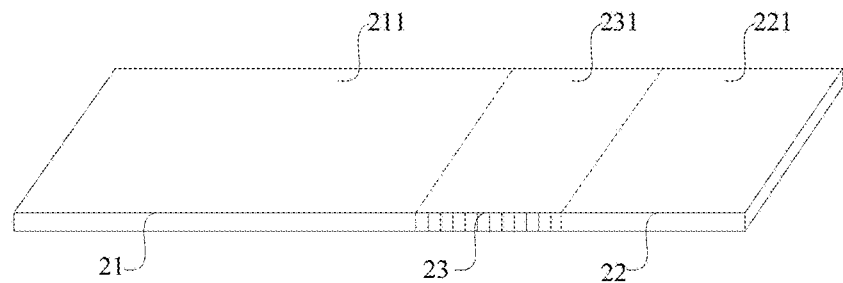
FIG. 10a is a schematic structural diagram of an electronic device in which a supporting component of a deformable portion includes one supporting component according to an embodiment of the present disclosure.
Figure 10B:
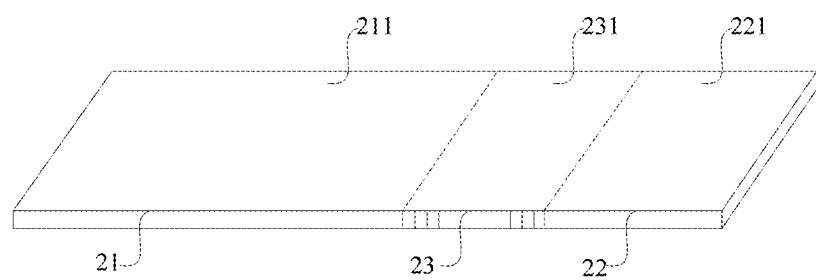
FIG. 10b is a schematic structural diagram of an electronic device in which a supporting component of a deformable portion includes two supporting components according to an embodiment of the present disclosure.

The supporting component of the deformable portion may include one supporting component, or may include two or more supporting components. FIG. 10 is a schematic structural diagram of an electronic device in which a supporting component of a deformable portion includes one supporting component according to an embodiment of the present disclosure, as shown in a 'ⵉⵉⵉⵉⵉⵉ' part in FIG. 10*a*. FIG. 10*b* is a schematic structural diagram of an electronic device in which a supporting component of a deformable portion includes two supporting components according to an embodiment of the present disclosure.

Correspondingly to the embodiments of method, an embodiment of the present disclosure further provides an electronic device. The electronic device according to an embodiment may include a flexible display screen, a sensing assembly, a deformation supporting component, a controllable component and a processor. The flexible display screen is located on a first surface of the electronic device and the controllable component is located on a second surface of the electronic device.

The processor is configured to acquire a sensing parameter with the sensing assembly, and process the sensing parameter and obtain a processing result, where the processing result indicates a deformation state of a deformable portion of the electronic device during a deformation of the electronic device, and the deformable portion includes the deformation supporting component and a supporting portion of the flexible display screen corresponding to the deformation supporting component; and the processor is further configured to activate the controllable component and start up a function mode corresponding to the controllable component, in a case where the processing result indicates that the deformation state of the deformable portion is a predetermined state.

With the electronic device according to the present disclosure, the processor acquires the sensing parameter generated in response to the deformation of the electronic device with the sensing component, processes the sensing parameter and obtains the processing result indicating the deformation state of the deformable portion of the electronic device during a deformation of the electronic device. And the processor activates the controllable component located on the second surface of the electronic device and starts up an operating mode corresponding to the controllable component in a case where the processing result indicates that the deformation state of the deformable portion is the predetermined state. Where the deformable portion includes the deformation supporting component and the supporting portion of the flexible display screen corresponding to the deformation supporting component, the flexible display screen is located on the first surface of the electronic device. That is to say, the electronic device according the embodiment of the present disclosure is a flexible electronic device. Some functions, i.e. functions related to the controllable components, of the electronic device may be triggered automatically as long as the shape of the electronic device is changed, thereby simplifying the user operation.

The electronic device may be divided, by the deformable portion, into a first body and a second body which are asymmetrical, with a volume of the second body being less than a volume of the first body. The second body may be stacked with the first body to form a folded attitude of the electronic device in a case where the deformation state of the deformable portion is the predetermined state.

The first surface may face away from the second surface. The first surface may include at least a first surface of the first body and a first surface of the second body, and the second surface may include at least a second surface of the first body and a second surface of the second body. The controllable component may be located on the second surface of the second body. The first surface of the first body may correspond to a first portion of the flexible display screen, and the first surface of the second body may correspond to a second portion of the flexible display screen. The first surface of the first body may face toward the first surface of the second body and the second surface of the first body may face away from the second surface of the second body, in a case where the second body is stacked with the first body.

The controllable component may be an input component. The processor configured to start up the function mode corresponding to the controllable component may be configured to control to display a display content related to the input component on a rest of the first portion of the flexible display screen which is not occluded by the second portion.

The input component may be a physical keyboard. The processor configured to display the display content related to the input component on the rest of the first portion of the flexible display screen which is not occluded by the second portion may be configured to control to display a character input box on the rest of the first portion of the flexible display screen which is not occluded by the second portion.

The input component may be a camera. The processor configured to display the display content related to the input component on the rest of the first portion of the flexible display screen which is not occluded by the second portion may be configured to: call a photographic application; and control to display an interface corresponding to the photographic application on the rest of the first portion of the flexible display screen which is not occluded by the second portion, and to display an image acquired by the camera in a real time manner in the interface.

The input component may be a touch input panel. The processor configured to display the display content related to the input component on the rest of the first portion of the flexible display screen which is not occluded by the second portion may be configured to: switch the electronic device from a first operating state to a second operating state, where a system power consumption of the electronic device in the second operating state is less than a system power consumption of the electronic device in the first operating state; and display M pieces of information received by the electronic device in the second operating state on the rest of the first portion of the flexible display screen which is not occluded by the second portion, with M being an integer greater than or equal to 1.

The deformable portion may include a first deformable sub-portion and a second deformable sub-portion. The electronic device may be divided, by the first deformable sub-portion and the second deformable sub-portion, into a first body, a second body and a third body which are asymmetrical. The predetermined state may include a predetermined state of the first deformable sub-portion and a predetermined state of the second deformable sub-portion.

In a case where the deformation state of the deformable portion is the predetermined state of the first deformable sub-portion, the second body may be stacked with an entity formed by the first body and the third body to form a first folded attitude of the electronic device. In a case where the deformation state of the deformable portion is the predetermined state of the second deformable sub-portion, the third body may be stacked with an entity formed by the first body and the second body to form a second folded attitude of the electronic device.

The first surface may face away from the second surface, the first surface may include at least a first surface of the first body, a first surface of the second body and a first surface of the third body, the second surface may include at least a second surface of the first body, a second surface of the second body and a second surface of the third body, the controllable component may include at least a first controllable component and a second controllable component, the first controllable component may be located on the second surface of the second body, the second controllable component may be located on the second surface of the third body, the first surface of the first body may correspond to a first portion of the flexible display screen, the first surface of the second body may correspond to a second portion of the flexible display screen, and the first surface of the third body may correspond to a third portion of the flexible display screen.

In a case where the second body is stacked with the entity formed by the first body and the third body, the first surface of the second body may face toward the first surface of the first body and the second surface of the second body may face away from the second surface of the first body.

In a case where the third body is stacked with the entity formed by the first body and the second body, the first surface of the third body may face toward the first surface of the first body and the second surface of the third body may face away from the second surface of the first body.

The electronic device may be divided, by the deformable portion, into a first body and a second body which are asymmetrical, with a volume of the second body being less than a volume of the first body, the first surface may face away from the second surface, the first surface may include at least a first surface of the first body and a first surface of the second body, the second surface may include at least a second surface of the first body and a second surface of the second body, the controllable component may be located on the second surface of the second body, the first surface of the first body may correspond to a first portion of the flexible display screen, and the first surface of the second body may correspond to a second portion of the flexible display screen. The predetermined state may include a first predetermined state and a second predetermined state.

In a case where the deformation state of the deformable portion is the first predetermined state, the second body may be stacked with the first body to form a first folded attitude of the electronic device.

In a case where the deformation state of the deformable portion is the second predetermined state, the second body may be stacked with the first body to form a second folded attitude of the electronic device.

In a case where the second body is stacked with the first body, the first surface of the first body may face toward the first surface of the second body and the second surface of the first body may face away from the second surface of the second body.

An area of a rest of the first portion of the flexible display screen which is not occluded by the second portion in a case where the electronic device is in the first folded attitude may be less than an area of a rest of the first portion of the flexible display screen which is not occluded by the second portion in a case where the electronic device is in the second folded attitude.

The controllable component may be a touch input panel operable in a trajectory input mode and a character input mode. The processor configured to the activate the controllable component is configured to activate the touch input panel and set the touch input panel to be in the trajectory input mode in a case where the deformation state of the deformable portion is the first predetermined state, or to activate the touch input panel and set the touch input panel to be in the character input mode in a case where the deformation state of the deformable portion is the second predetermined state.

The processor may be further configured to control to switch the touch input panel from the trajectory input mode to the character input mode in a case where the deformation state of the deformable portion is changed from meeting a first predetermined state deformation to meeting a second predetermined state deformation; and/or control to switch the touch input panel from the character input mode to the trajectory input mode in a case where the deformation state of the deformable portion is changed from meeting the second predetermined state deformation to meeting the first predetermined state deformation.

The deformation supporting component of the deformable portion may include multiple rotating shafts, and the rotating shafts provide frictional forces for simultaneous rotations or frictional forces for successive rotations.

The embodiments in this specification are described in a progressive way, each of which emphasizes the differences from others, and the same or similar parts among the embodiments can be referred to each other. Since the electronic device disclosed in the embodiments corresponds to the method therein, the description thereof is relatively simple, and for relevant matters references may be made to the description of the method.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the technical field.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. An information processing method, comprising:
    acquiring a sensing parameter with a sensing assembly of an electronic device, wherein the sensing parameter is generated in response to a deformation of the electronic device, wherein:
        the electronic device is divided, by a deformable portion, into a first body and a second body which are asymmetrical, wherein a volume of the second body is less than a volume of the first body,
        a flexible display screen is located on a first surface of the electronic device, and comprises a first portion and a second portion,
        a controllable component is located on a second surface of the second body of the electronic device, wherein the first surface faces away from the second surface and wherein the controllable component is an input component,
        the first surface comprises at least a first surface of the first body and a first surface of the second body, wherein the first surface of the first body corresponds to the first portion of the flexible display screen, and the first surface of the second body corresponds to the second portion of the flexible display screen, and
        the second surface comprises at least a second surface of the first body and the second surface of the second body;
    processing the sensing parameter and obtaining a processing result, wherein the processing result indicates a deformation state of the deformable portion of the electronic device during the deformation of the electronic device; and
    activating the controllable component, and controlling to display a display content related to the controllable component on a rest of the first portion of the flexible display screen which is not occluded by the second portion in a case where the processing result indicates that the deformation state of the deformable portion is that the second body is stacked with the first body to form a folded attitude of the electronic device, wherein the first surface of the first body faces toward the first surface of the second body and the second surface of the first body faces away from the second surface of the second body in the folded attitude of the electronic device and wherein the controllable component is in an inactive state in a case where the processing result does not indicate that the deformation state of the deformable portion is that the second body is stacked with the first body to form the folded attitude of the electronic device,
    wherein the input component is a physical keyboard, and the controlling to display the display content related to the input component on the rest of the first portion of the flexible display screen which is not occluded by the second portion comprises controlling to display a character input box on the rest of the first portion of the flexible display screen which is not occluded by the second portion, or
    wherein the input component is a camera, and the controlling to display the display content related to the input component on the rest of the first portion of the flexible display screen which is not occluded by the second portion comprises:
        calling a photographic application; and
        controlling to display an interface corresponding to the photographic application on the rest of the first portion of the flexible display screen which is not occluded by the second portion, and to display an image acquired by the camera in a real time manner in the interface.

2. The method according to claim 1, wherein:
    the deformable portion comprises a first deformable sub-portion and a second deformable sub-portion, and the electronic device is divided, by the first deformable sub-portion and the second deformable sub-portion, into a first body, a second body and a third body which are asymmetrical;
    the predetermined state comprises a predetermined state of the first deformable sub-portion and a predetermined state of the second deformable sub-portion;
    in a case where the deformation state of the deformable portion is the predetermined state of the first deformable sub-portion, the second body is stacked with an entity formed by the first body and the third body to form a first folded attitude of the electronic device; and
    in a case where the deformation state of the deformable portion is the predetermined state of the second deformable sub-portion, the third body is stacked with an entity formed by the first body and the second body to form a second folded attitude of the electronic device.

3. The method according to claim 2, wherein:
    the first surface faces away from the second surface, the first surface comprises at least a first surface of the first body, a first surface of the second body and a first surface of the third body, the second surface comprises at least a second surface of the first body, a second surface of the second body and a second surface of the third body, the controllable component comprises at least a first controllable component and a second controllable component, the first controllable component is located on the second surface of the second body, the second controllable component is located on the second surface of the third body, the first surface of the first body corresponds to a first portion of the flexible display screen, the first surface of the second body corresponds to a second portion of the flexible display screen, and the first surface of the third body corresponds to a third portion of the flexible display screen;
    in a case where the second body is stacked with the entity formed by the first body and the third body, the first surface of the second body faces toward the first surface of the first body and the second surface of the second body faces away from the second surface of the first body; and
    in a case where the third body is stacked with the entity formed by the first body and the second body, the first surface of the third body faces toward the first surface of the first body and the second surface of the third body faces away from the second surface of the first body.

4. The method according to claim 1,
wherein the electronic device is divided, by the deformable portion, into a first body and a second body which are asymmetrical, with a volume of the second body being less than a volume of the first body, the first surface faces away from the second surface, the first surface comprises at least a first surface of the first body and a first surface of the second body, the second surface comprises at least a second surface of the first body and a second surface of the second body, the controllable component is located on the second surface of the second body, the first surface of the first body corresponds to a first portion of the flexible display screen, and the first surface of the second body corresponds to a second portion of the flexible display screen;
wherein the predetermined state comprises a first predetermined state and a second predetermined state;
wherein:
in a case where the deformation state of the deformable portion is the first predetermined state, the second body is stacked with the first body to form a first folded attitude of the electronic device; or
in a case where the deformation state of the deformable portion is the second predetermined state, the second body is stacked with the first body to form a second folded attitude of the electronic device;
wherein in a case where the second body is stacked with the first body, the first surface of the first body faces toward the first surface of the second body, and the second surface of the first body faces away from the second surface of the second body; and
wherein an area of a rest of the first portion of the flexible display screen which is not occluded by the second portion in a case where the electronic device is in the first folded attitude is less than an area of a rest of the first portion of the flexible display screen which is not occluded by the second portion in a case where the electronic device is in the second folded attitude.

5. The method according to claim 4, wherein:
the controllable component is a touch input panel operable in a trajectory input mode and a character input mode; and
the activating the controllable component located on the second surface of the electronic device comprises:
activating the touch input panel and setting the touch input panel to be in the trajectory input mode, in a case where the deformation state of the deformable portion is the first predetermined state, or
activating the touch input panel and setting the touch input panel to be in the character input mode, in a case where the deformation state of the deformable portion is the second predetermined state.

6. The method according to claim 4, further comprising:
controlling to switch a touch input panel from a trajectory input mode to a character input mode in a case where the deformation state of the deformable portion is changed from meeting a first predetermined state deformation to meeting a second predetermined state deformation; and/or
controlling to switch the touch input panel from the character input mode to the trajectory input mode in a case where the deformation state of the deformable portion is changed from meeting a second predetermined state deformation to meeting a first predetermined state deformation.

7. The method according to claim 1, wherein the deformable portion comprises a deformation supporting component and a supporting portion of the flexible display screen corresponding to the deformation supporting component.

8. The method according to claim 7, wherein the deformation supporting component of the deformable portion comprises a plurality of rotating shafts, and the plurality of rotating shafts provide frictional forces for simultaneous rotations or frictional forces for successive rotations.

9. An electronic device, comprising:
a flexible display screen;
a sensing assembly;
a deformation supporting component;
a controllable component; and
a processor,
wherein:
the electronic device is divided, by a deformable portion, into a first body and a second body which are asymmetrical, wherein a volume of the second body is less than a volume of the first body,
the flexible display screen is located on a first surface of the electronic device and comprises a first portion and a second portion,
the controllable component is located on a second surface of the second body of the electronic device, wherein the first surface faces away from the second surface and wherein the controllable component is an input component,
the first surface comprises at least a first surface of the first body and a first surface of the second body, wherein the first surface of the first body corresponds to the first portion of the flexible display screen and the first surface of the second body corresponds to the second portion of the flexible display screen,
the second surface comprises at least a second surface of the first body and the second surface of the second body,
the processor is configured to acquire a sensing parameter with the sensing assembly, and process the sensing parameter and obtain a processing result, wherein the processing result indicates a deformation state of the deformable portion of the electronic device during the deformation of the electronic device, and the electronic device is divided, by the deformable portion, into a first body and a second body which are asymmetrical, with a volume of the second body being less than a volume of the first body, and
the processor is configured to activate the controllable component and control the flexible display screen to display a display content related to the controllable component on a rest of the first portion of the flexible display screen which is not occluded by the second portion in a case where the processing result indicates that the deformation state of the deformable portion is that the second body is stacked with the first body to form a folded attitude of the electronic device, wherein the first surface of the first body faces toward the first surface of the second body and the second surface of the first body faces away from the second surface of the second body in the folded attitude of the electronic device and wherein the controllable component is in an inactive state in a case where the processing result does not indicate that the deformation state of the deformable portion is that the second body is stacked with the first body to form the folded attitude of the electronic device, and wherein:
- the input component is a physical keyboard, and the processor is configured to display a character input box on the rest of the first portion of the flexible display screen which is not occluded by the second portion, or
- the input component is a camera, and the processor is configured to call a photographic application, and display an interface corresponding to the photographic application on the rest of the first portion of the flexible display screen which is not occluded by the second portion, and to display an image acquired by the camera in a real time manner in the interface.

10. The electronic device according to claim 9,
wherein the deformable portion comprises a first deformable sub-portion and a second deformable sub-portion, and the electronic device is divided, by the first deformable sub-portion and the second deformable sub-portion, into a first body, a second body and a third body which are asymmetrical;
wherein the predetermined state comprises a predetermined state of the first deformable sub-portion and a predetermined state of the second deformable sub-portion; and wherein:
- in a case where the deformation state of the deformable portion is the predetermined state of the first deformable sub-portion, the second body is stacked with an entity formed by the first body and the third body to form a first folded attitude of the electronic device; or
- in a case where the deformation state of the deformable portion is the predetermined state of the second deformable sub-portion, the third body is stacked with an entity formed by the first body and the second body to form a second folded attitude of the electronic device.

11. The electronic device according to claim 10, wherein:
the first surface faces away from the second surface, the first surface comprises at least a first surface of the first body, a first surface of the second body and a first surface of the third body, the second surface comprises at least a second surface of the first body, a second surface of the second body and a second surface of the third body, the controllable component comprises at least a first controllable component and a second controllable component, the first controllable component is located on the second surface of the second body, the second controllable component is located on the second surface of the third body, the first surface of the first body corresponds to a first portion of the flexible display screen, the first surface of the second body corresponds to a second portion of the flexible display screen, and the first surface of the third body corresponds to a third portion of the flexible display screen;
in a case where the second body is stacked with the entity formed by the first body and the third body, the first surface of the second body faces toward the first surface of the first body and the second surface of the second body faces away from the second surface of the first body; and
in a case where the third body is stacked with the entity formed by the first body and the second body, the first surface of the third body faces toward the first surface of the first body and the second surface of the third body faces away from the second surface of the first body.

12. The electronic device according to claim 9,
wherein the electronic device is divided, by the deformable portion, into a first body and a second body which are asymmetrical, with a volume of the second body being less than a volume of the first body, the first surface faces away from the second surface, the first surface comprises at least a first surface of the first body and a first surface of the second body, the second surface comprises at least a second surface of the first body and a second surface of the second body, the controllable component is located on the second surface of the second body, the first surface of the first body corresponds to a first portion of the flexible display screen, and the first surface of the second body corresponds to a second portion of the flexible display screen;
wherein the predetermined state comprises a first predetermined state and a second predetermined state;
wherein:
- in a case where the deformation state of the deformable portion is the first predetermined state, the second body is stacked with the first body to form a first folded attitude of the electronic device; or
- in a case where the deformation state of the deformable portion is the second predetermined state, the second body is stacked with the first body to form a second folded attitude of the electronic device;

wherein in a case where the second body is stacked with the first body, the first surface of the first body faces toward the first surface of the second body and the second surface of the first body faces away from the second surface of the second body; and
wherein an area of a rest of the first portion of the flexible display screen which is not occluded by the second portion in a case where the electronic device is in the first folded attitude is less than an area of a rest of the first portion of the flexible display screen which is not occluded by the second portion in a case where the electronic device is in the second folded attitude.

13. The electronic device according to claim 12, wherein:
the controllable component is a touch input panel operable in a trajectory input mode and a character input mode; and
the processor is configured to:
- activate the touch input panel and set the touch input panel to be in the trajectory input mode in a case where the deformation state of the deformable portion is the first predetermined state, or
- activate the touch input panel and set the touch input panel to be in the character input mode in a case where the deformation state of the deformable portion is the second predetermined state.

14. The electronic device according to claim 13, wherein the processor is further configured to:
- switch the touch input panel from the trajectory input mode to the character input mode in a case where the deformation state of the deformable portion is changed from meeting a first predetermined state deformation to meeting a second predetermined state deformation; and/or
- switch the touch input panel from the character input mode to the trajectory input mode in a case where the deformation state of the deformable portion is changed from meeting the second predetermined state deformation to meeting the first predetermined state deformation.

15. The electronic device according to claim 9, wherein the deformable portion comprises a deformation supporting component and a supporting portion of the flexible display screen corresponding to the deformation supporting component.

16. The electronic device according to claim 15, wherein the deformation supporting component of the deformable portion comprises a plurality of rotating shafts, and the plurality of rotating shafts provide frictional forces for simultaneous rotations or frictional forces for successive rotations.

17. An information processing method, comprising:
acquiring a sensing parameter with a sensing assembly of an electronic device, wherein the sensing parameter is generated in response to a deformation of the electronic device, wherein:
   the electronic device is divided, by a deformable portion, into a first body and a second body which are asymmetrical, wherein a volume of the second body is less than a volume of the first body,
   a flexible display screen is located on a first surface of the electronic device, and comprises a first portion and a second portion,
   a controllable component is located on a second surface of the second body of the electronic device, wherein the first surface faces away from the second surface and wherein the controllable component is an input component,
   the first surface comprises at least a first surface of the first body and a first surface of the second body, wherein the first surface of the first body corresponds to the first portion of the flexible display screen, and the first surface of the second body corresponds to the second portion of the flexible display screen, and
   the second surface comprises at least a second surface of the first body and the second surface of the second body;
processing the sensing parameter and obtaining a processing result, wherein the processing result indicates a deformation state of the deformable portion of the electronic device during the deformation of the electronic device; and
activating the controllable component, and controlling to display a display content related to the controllable component on a rest of the first portion of the flexible display screen which is not occluded by the second portion in a case where the processing result indicates that the deformation state of the deformable portion is that the second body is stacked with the first body to form a folded attitude of the electronic device, wherein the first surface of the first body faces toward the first surface of the second body and the second surface of the first body faces away from the second surface of the second body in the folded attitude of the electronic device,
wherein the input component is a touch input panel, and the controlling to display the display content related to the input component on the rest of the first portion of the flexible display screen which is not occluded by the second portion comprises:
   switching the electronic device from a first operating state to a second operating state, wherein a system power consumption of the electronic device in the second operating state is less than a system power consumption of the electronic device in the first operating state; and
   displaying M pieces of information received by the electronic device in the second operating state on the rest of the first portion of the flexible display screen which is not occluded by the second portion, with M being an integer greater than or equal to 1.

18. An electronic device, comprising:
a flexible display screen;
a sensing assembly;
a deformation supporting component;
a controllable component; and
a processor,
wherein:
   the electronic device is divided, by a deformable portion, into a first body and a second body which are asymmetrical, wherein a volume of the second body is less than a volume of the first body,
   the flexible display screen is located on a first surface of the electronic device and comprises a first portion and a second portion,
   the controllable component is located on a second surface of the second body of the electronic device, wherein the first surface faces away from the second surface and wherein the controllable component is an input component,
   the first surface comprises at least a first surface of the first body and a first surface of the second body, wherein the first surface of the first body corresponds to the first portion of the flexible display screen and the first surface of the second body corresponds to the second portion of the flexible display screen,
   the second surface comprises at least a second surface of the first body and the second surface of the second body,
   the processor is configured to acquire a sensing parameter with the sensing assembly, and process the sensing parameter and obtain a processing result, wherein the processing result indicates a deformation state of the deformable portion of the electronic device during the deformation of the electronic device, and the electronic device is divided, by the deformable portion, into a first body and a second body which are asymmetrical, with a volume of the second body being less than a volume of the first body, and
   the processor is configured to activate the controllable component and control the flexible display screen to display a display content related to the controllable component on a rest of the first portion of the flexible display screen which is not occluded by the second portion in a case where the processing result indicates that the deformation state of the deformable portion is that the second body is stacked with the first body to form a folded attitude of the electronic device, wherein the first surface of the first body faces toward the first surface of the second body and the second surface of the first body faces away from the second surface of the second body in the folded attitude of the electronic device, and
wherein the input component is a touch input panel, and the processor is configured to switch the electronic device from a first operating state to a second operating state, wherein a system power consumption of the electronic device in the second operating state is less than a system power consumption of the electronic device in the first operating state; and display M pieces of information received by the electronic device in the second operating state on the rest of the first portion of the flexible display screen which is not occluded by the second portion, with M being an integer greater than or equal to 1.

* * * * *